G. SCHRADE.
ATTACHABLE HEEL.
Reissued Oct. 21, 1919. 14,740.
APPLICATION FILED SEPT. 4, 1919.
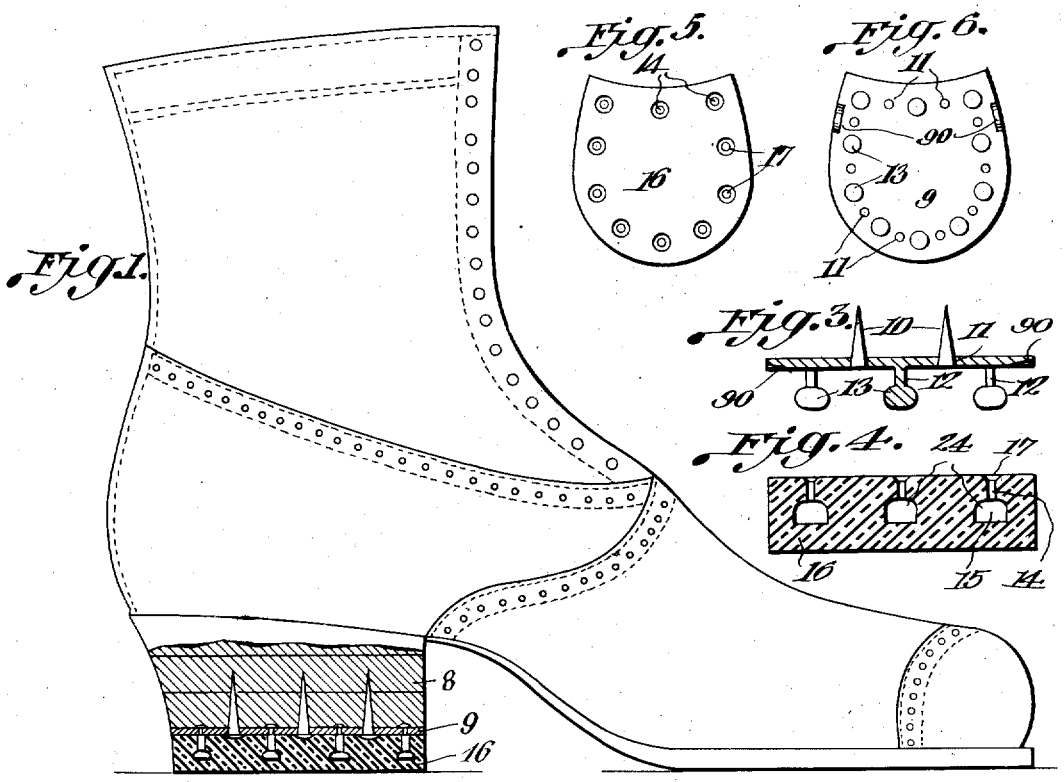
Fig. 2.
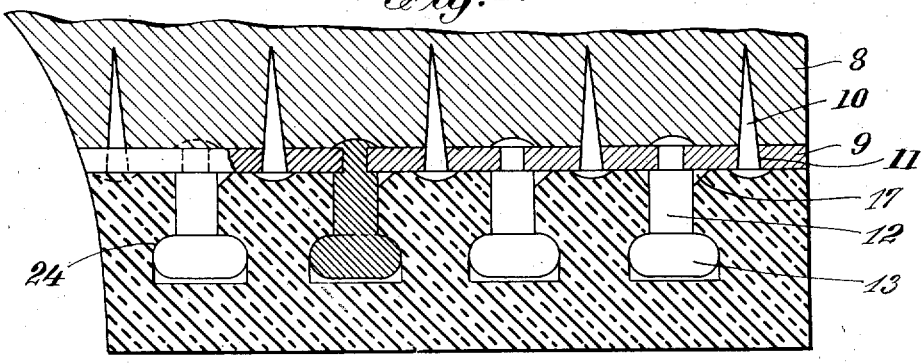
INVENTOR.
George Schrade
Frederick V. Winter
his ATTORNEY

UNITED STATES PATENT OFFICE.

GEORGE SCHRADE, OF NEW YORK, N. Y.

ATTACHABLE HEEL.

14,740. Specification of Reissued Letters Patent. Reissued Oct. 21, 1919.

Original No. 1,298,104, dated March 25, 1919, Serial No. 202,159, filed November 15, 1917. Application for reissue filed September 4, 1919. Serial No. 322,185.

*To all whom it may concern:*

Be it known that I, GEORGE SCHRADE, a citizen of the United States, residing at New York, in the county and State of New York, have invented certain new and useful Improvements in Attachable Heels, of which the following is a full, clear, and exact specification.

This invention relates to heels for shoes, and has for its object to provide an improved heel of rubber, or other suitable material, which may be readily attached to either ladies' or men's shoe heels. Obviously, attachable soles for shoes may also be made and attached like the heels herein shown and described.

It is the aim of this invention to provide a heel which may be attached or detached by the wearer, thus avoiding the necessity of going to or employing a shoe-maker every time it is desired to substitute a different heel, for a worn out one, on a shoe. The easily attachable and detachable feature hereinafter described also enables the wearer to change the heel or heels from one shoe to the other at will so as to cause them to wear down more uniformly, it being a well known fact that both heels of a pair of shoes do not wear down alike. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a broken side elevation of a man's shoe having attached thereto a modified form of heel member or botton lift made of rubber or other elastic material.

Fig. 2 is a section of the heel shown in Fig. 1 drawn to a larger scale to show more clearly the form of the sockets which are molded in the elastic member.

Fig. 3 is a section of the attaching plate used with an elastic heel member.

Fig. 4 is a vertical section of the elastic heel member.

Fig. 5 is a plan view of said elastic heel member.

Fig. 6 is an under plan view of the attaching plate for the same.

The heel 8 of the shoe has the metal plate 9 fastened thereto by the nails 10 passed through holes 11 therein, and said plate has downwardly extending pins 12 provided with heads 13. The elastic heel member or bottom lift 16 has sockets 14 of less diameter than the heads 13 of the pins 12, but at the inner ends of said sockets there are formed enlarged cavities 15 to receive said heads, as shown in Figs. 1 and 4. The heads may be forced through the sockets 14 and when they reach the enlarged cavities they will retain the heel member or bottom lift 16 on the shoe without danger of accidental displacement. At the same time, the elastic heel member 16 may be pried off by a suitable tool inserted between it and the metal plate 9, in grooves 90 formed in the lateral edges thereof. The outer ends of the cavities 14 are preferably countersunk, as at 17, Figs. 2, 4 and 5 to facilitate the attachment of the resilient heel member to the plate 9.

Having thus described my invention, what I claim as new and desire to secure by Letters Patent of the United States is:—

1. The combination with an attachable outer heel member of elastic material having sockets formed therein and opening on the upper surface thereof, each socket leading to a separate enlarged blind cavity in the interior of the heel member, of a metal attaching plate to be secured to the heel of a shoe and having projecting pins to fit said sockets and directly engage the elastic material of said heel member surrounding said sockets, said pins having heads of greater diameter than the sockets for directly engaging the elastic material of the heel member surrounding said enlarged cavities.

2. The combination with an attachable outer heel member of elastic material having sockets formed therein and opening on the upper surface thereof, each socket leading to a separate enlarged blind cavity in the interior of the heel member, of a metal attaching plate to be secured to the heel of a shoe and having projecting pins to fit said sockets and directly engage the elastic material of said heel member surrounding said sockets, said pins having heads of greater diameter than the sockets for directly engaging the elastic material of the heel member surrounding said enlarged cavities, the upper walls of said cavities being concave for facilitating the withdrawal of the heads of the pins.

In testimony whereof I have signed my name to this specification.

GEORGE SCHRADE.